United States Patent
Nakayama

(10) Patent No.: US 9,020,285 B2
(45) Date of Patent: Apr. 28, 2015

(54) COMPRESSOR, DRIVING DEVICE, AND DISPLAY DEVICE

(71) Applicant: Samsung Display Co., Ltd., Yongin, Gyeonggi-Do (KR)

(72) Inventor: Shintaro Nakayama, Yokohama (JP)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 27 days.

(21) Appl. No.: 14/043,979

(22) Filed: Oct. 2, 2013

(65) Prior Publication Data

US 2014/0093181 A1 Apr. 3, 2014

(30) Foreign Application Priority Data

Oct. 2, 2012 (JP) ................. 2012-220550

(51) Int. Cl.
*G06K 9/46* (2006.01)
*G06T 9/00* (2006.01)

(52) U.S. Cl.
CPC ...................................... *G06T 9/008* (2013.01)

(58) Field of Classification Search
CPC .................. H04N 19/00593; H04N 19/00569; H04N 19/20; H04N 19/46; H04N 19/597; H04N 19/96; G06T 9/001; G06T 9/008; G06T 9/40
USPC ......... 382/232, 162, 233, 238, 247, 250, 251; 375/240.12; 348/384.1, 393.1, 397.1, 348/398.1, 401.1, 403.1, 404.1; 345/555; 708/203
See application file for complete search history.

(56) References Cited

U.S. PATENT DOCUMENTS

| 6,173,078 B1 * | 1/2001 | Kadono ........................ 382/238 |
| 2014/0003511 A1 * | 1/2014 | Shimizu et al. .......... 375/240.12 |

FOREIGN PATENT DOCUMENTS

| JP | 10-023428 A | 1/1998 |
| JP | 10-056638 A | 2/1998 |
| JP | 2001-257888 A | 9/2001 |
| JP | 2005-191939 A | 7/2005 |
| JP | 2007-018051 A | 1/2007 |
| JP | 2007-235758 A | 9/2007 |
| JP | 2010-011386 A | 1/2010 |

* cited by examiner

*Primary Examiner* — Ali Bayat
(74) *Attorney, Agent, or Firm* — Lee & Morse, P.C.

(57) ABSTRACT

A compressor includes a memory storing a de-compression pixel value de-compressed after a pixel value is compressed, a direct compression unit compressing a pixel value corresponding to a compression target pixel, and a first difference compression unit configured to compress a difference value between the pixel value corresponding to the compression target pixel and a decompression pixel value corresponding to at least one reference pixel, an error evaluation unit, and a decompression unit. The error evaluation unit compares a pixel value error of the direct compression unit before and after compression with a difference value error of the first difference compression unit before and after compression and outputs a compression value obtained through compression of the direct compression unit or a compression value obtained through compression of the first difference compression unit together with an identifier indicating a compression method, based on the comparison result, to the decompression unit.

14 Claims, 12 Drawing Sheets

Direct compression unit (no reference pixel)

Pt

Difference compression unit A (reference pixel: 3 pixels)

Difference compression unit B (reference pixel: 4 pixels)

Difference compression unit C (reference pixel: 16 pixels)

Fig. 5A

Direct compression unit

| 1bit | 4bit | 4bit | 3bit |
|---|---|---|---|
| 0 | R | G | B |

Identifier | Compression Value

Fig. 5B

Difference compression unit A

| 1bit | 2bit | 3bit | 3bit | 3bit |
|---|---|---|---|---|
| 1 | Ref | $Q_R$ | $Q_G$ | $Q_B$ |

Identifier | Compression Value

Fig. 5C

Difference compression unit B

| 1bit | 2bit | 2bit | 2bit | 3bit | 2bit |
|---|---|---|---|---|---|
| 1 | 11 | Ref | $Q_R$ | $Q_G$ | $Q_B$ |

Identifier | Compression Value

Fig. 5D

Difference compression unit C

| 1bit | 4bit | 2bit | 3bit | 2bit |
|---|---|---|---|---|
| 1 | Ref | $Q_R$ | $Q_G$ | $Q_B$ |

Identifier | Compression Value

Fig. 6

Quantization table
(Direct compression unit)

R:4bit, G:4bit

| Pixel Value Pt | Quantization Value |
|---|---|
| 0-8 | 0 |
| 9-25 | 17 |
| 26-42 | 34 |
| 43-59 | 51 |
| 60-76 | 68 |
| 77-93 | 85 |
| 94-110 | 102 |
| 111-127 | 119 |
| 128-144 | 136 |
| 145-161 | 153 |
| 162-178 | 170 |
| 179-195 | 187 |
| 196-212 | 204 |
| 213-229 | 221 |
| 230-246 | 238 |
| 247-255 | 255 |

B:3bit

| Pixel Value Pt | Quantization Value |
|---|---|
| 0-17 | 0 |
| 18-53 | 36 |
| 54-89 | 72 |
| 90-125 | 108 |
| 126-161 | 144 |
| 162-197 | 180 |
| 198-233 | 216 |
| 234-255 | 255 |

Fig. 7

Quantization table
(Difference compression unit A)

R:3bit, G:3bit, B:3bit

| Difference Value Pt-PEn | Q |
|---|---|
| 0 | 0 |
| 1 | 1 |
| -1 | 2 |
| 4 | 3 |
| -4 | 4 |
| 16 | 5 |
| -16 | 6 |
| 32 | 7 |

Fig. 8

Quantization table
(Difference compression unit B)

G:3bit

| Difference Value Pt-PEn | Q |
|---|---|
| 0 | 0 |
| 1 | 1 |
| -1 | 2 |
| 4 | 3 |
| -4 | 4 |
| 16 | 5 |
| -16 | 6 |
| 32 | 7 |

R:2bit, B:2bit

| Difference Value Pt-PEn | Q |
|---|---|
| 0 | 0 |
| 4 | 1 |
| -4 | 2 |
| 16 | 3 |

Fig. 9

Quantization table
(Difference compression unit C)

G:3bit

| Difference Value Pt-PEn | Q |
|---|---|
| 0 | 0 |
| 4 | 1 |
| -4 | 2 |
| 16 | 3 |
| -16 | 4 |
| 32 | 5 |
| -32 | 6 |
| 64 | 7 |

R:2bit, B:2bit

| Difference Value Pt-PEn | Q |
|---|---|
| 0 | 0 |
| 16 | 1 |
| -16 | 2 |
| 32 | 3 |

COMPRESSOR, DRIVING DEVICE, AND DISPLAY DEVICE

CROSS-REFERENCE TO RELATED APPLICATIONS

Japanese Patent Application No. 2012-220550, filed on Oct. 2, 2012, in the Korean Intellectual Property Office, and entitled: "COMPRESSOR, DRIVING DEVICE, AND DISPLAY DEVICE," is incorporated by reference herein in its entirety.

BACKGROUND

1. Field

Embodiments relate to a compressor of image data, a driving device including the same, and a display device including the driving device.

2. Description of the Related Art

A frame memory having a capacity determined according to the number of pixels of a display panel and the number of gray scale levels for display is used to drive a display panel. A display panel capable of being applied to a cellular phone, a smart phone, etc., uses high density, miniaturized pixels to improve the display quality of the display panel.

SUMMARY

An embodiment provides a compressor which receives image data indicating pixel values of a plurality of pixels and compresses a pixel value corresponding to each pixel. The compressor may include a memory configured to store a de-compression pixel value de-compressed after the pixel value is compressed; a direct compression unit configured to compress a pixel value corresponding to a compression target pixel; a first difference compression unit configured to compress a difference value between the pixel value corresponding to the compression target pixel and a de-compression pixel value corresponding to at least one reference pixel relatively decided with respect to the compression target pixel; an error evaluation unit configured to compare a pixel value error of the direct compression unit before and after compression with a difference value error of the first difference compression unit before and after compression and to output a compression value obtained through compression of the direct compression unit or a compression value obtained through compression of the first difference compression unit together with an identifier indicating a compression method, based on the comparison result; and a de-compression unit configured to de-compress an output compression value using a method indicated by the identifier and to store the de-compression result in the memory as a de-compression pixel value corresponding to the compression target pixel.

In exemplary embodiments, the first difference compression unit compresses a plurality of difference values obtained to correspond the reference pixel provided in plurality, and the error evaluation unit compares the pixel value error of the direct compression unit before and after compression with difference value errors of the first difference compression unit before and after compression.

In other exemplary embodiments, the compressor may further include a second difference compression unit configured to compress another plurality of difference values through a quantization method where less quantization bits compared to the first difference compression unit are utilized, the another plurality of difference values being obtained from the pixel value corresponding to the compression target pixel and de-compression pixel values corresponding to reference pixels the number of which is more than the number of the reference pixel used for the first difference compression unit, and when the second difference compression unit is added, the error evaluation unit compares the pixel value error of the direct compression unit before and after compression with difference value errors of the first and second difference compression units before and after compression and outputs a compression value obtained through compression of the direct compression unit, a compression value obtained through compression of the first difference compression unit or a compression value obtained through compression of the second difference compression unit together with the identifier, based on the comparison result in which the second difference compression unit is involved.

The compressor may further include a determination unit configured to determine whether the compression target pixel is at a first state or at a second state, based on a plurality of de-compression pixel values stored in the memory. When it is determined that whether the compression target pixel is at the first state, the error evaluation unit compares the pixel value error of the direct compression unit before and after compression with the difference value errors of the first difference compression unit before and after compression. When it is determined that whether the compression target pixel is at the second state, the error evaluation unit compares the pixel value error of the direct compression unit before and after compression with the difference value errors of the second difference compression unit before and after compression.

In other exemplary embodiments, the compressor further comprises a second difference compression unit configured to compress the plurality of difference values obtained from the pixel value corresponding to the compression target pixel and de-compression pixel values corresponding to the reference pixel provided in plurality through a quantization method different from that of the first difference compression unit. When the second difference compression unit is added, the error evaluation unit compares the pixel value error of the direct compression unit before and after compression with difference value errors of the first and second difference compression units before and after compression and outputs a compression value obtained through compression of the direct compression unit, a compression value obtained through compression of the first difference compression unit or a compression value obtained through compression of the second difference compression unit together with the identifier, based on the comparison result in which the second difference compression unit is involved.

In other exemplary embodiments, the compressor further includes a determination unit configured to determine whether the compression target pixel is at a first state or at a second state, based on a plurality of de-compression pixel values stored in the memory. When it is determined that whether the compression target pixel is at the first state, the error evaluation unit compares the pixel value error of the direct compression unit before and after compression with the difference value errors of the first difference compression unit before and after compression. When it is determined that whether the compression target pixel is at the second state, the error evaluation unit compares the pixel value error of the direct compression unit before and after compression with difference value errors of the second difference compression unit before and after compression.

In other exemplary embodiments, a determination reference of the determination unit is variable according to whether the compression target pixel proximately determined is at the first state or at the second state.

In other exemplary embodiments, the de-compression unit de-compresses the output compression value based on the identifier and a determination result of the determination unit and stores the de-compressed result in the memory.

The compressor may include a third difference compression unit configured to compress a third plurality of difference values through a quantization method using fewer quantization bits than the first difference compression unit, the third plurality of difference values being obtained from the pixel value corresponding to the compression target pixel and de-compression pixel values corresponding to a third plurality of reference pixels, the third plurality being less than the second plurality and greater than the first plurality.

Reference pixels of the first plurality of reference pixels may all be different than reference pixels of the third plurality of reference pixels.

Reference pixels of the second plurality of reference pixels may include reference pixels of the first plurality of pixels and reference pixels of the third plurality of reference pixels.

When the compression target pixel is in the first state, the error evaluation unit may compare the pixel value error of the direct compression unit before and after compression, the difference value errors of the first difference compression unit before and after compression, and the difference value errors of the third difference compression unit before and after comparison.

Also, a driving device according to an embodiment includes compressor; a frame memory configured to store the output compression value and the identifier; a de-compressor configured to decompress a compression value stored in the frame memory using a method based on the identifier; and a driving unit configured to drive a plurality of pixels of a display panel, based on a pixel value obtained through de-compression of the de-compressor.

Also, a display device is provided which comprises the driving device and the display panel.

BRIEF DESCRIPTION OF THE FIGURES

Features will become apparent to those of skill in the art by describing in detail exemplary embodiments with reference to the attached drawings in which:

FIGS. 5A to 5D illustrate diagrams for describing a configuration of compression data of each compression method according to an embodiment FIG. 6 illustrates a diagram for describing a quantization table for use in a direct compression unit 120 according to an embodiment.

FIG. 7 illustrates a diagram for describing a quantization table for use in a difference compression unit A 131 according to an embodiment.

FIG. 8 illustrates a diagram for describing a quantization table for use in a difference compression unit B 132 according to an embodiment.

FIG. 9 illustrates a diagram for describing a quantization table for use in a difference compression unit C 133 according to an embodiment.

DETAILED DESCRIPTION

Figure 1:
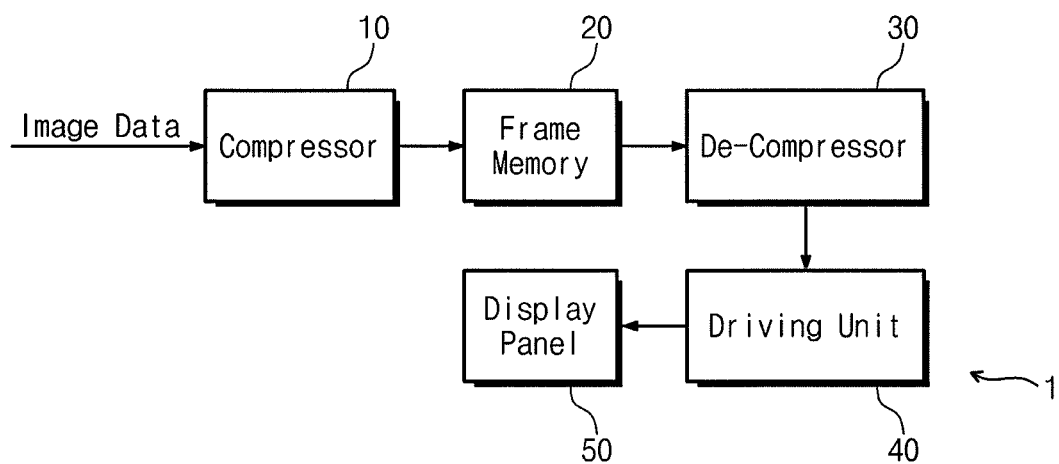
FIG. 1 illustrates a block diagram of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Accordingly, known processes, elements, and techniques are not described with respect to some of the embodiments of. Unless otherwise noted, like reference numerals denote like elements throughout the attached drawings and written description, and thus descriptions will not be repeated.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 illustrates a block diagram of a display device 1 according to an embodiment. A display device 1 is a device for displaying an image, e.g., in a smart phone, a cellular phone, a personal computer, a television, etc. The display device 1 may be an organic EL display, a liquid crystal monitor, etc. The display device 1 may include a compressor 10, a frame memory 20, a de-compressor 30, a driving unit 40, and a display panel 50. All or part of the compressor 10, the de-compressor 30 and the driving unit 40 may be implemented by software using a program executed by a central processing unit (CPU) or by hardware.

An image is displayed on the display panel 50 based on image data indicating a pixel value of each pixel. The display panel 50 has a plurality of pixels (e.g., an m×n matrix). In exemplary embodiments, each pixel is formed of sub pixels of three colors, e.g., R (red), G (green), and B (blue). In input image data, a pixel value of each pixel is defined by 24 bits (8 bits per color R/G/B). However, embodiments are not limited thereto. For example, a pixel value of each pixel may be defined by fewer bits (e.g., 18 bits) or by more bits (e.g., 30 bits, 48 bits, etc.).

As illustrated in FIG. 1, image data may be compressed by the compressor 10 and the compressed data is stored in the frame memory 20. In exemplary embodiments, 24-bit data corresponding to each pixel is compressed to 12-bit data, i.e., compression may halve the size of input image data. Compressed data stored in the frame memory 20 is de-compressed by the de-compressor 30. The driving unit 40 drives the display panel 50 using the de-compressed data and includes a driving circuit for controlling each pixel to display a gray scale according to a pixel value. An image corresponding to image data is displayed on the display panel 50 in accordance with the driving circuit.

Figure 2:
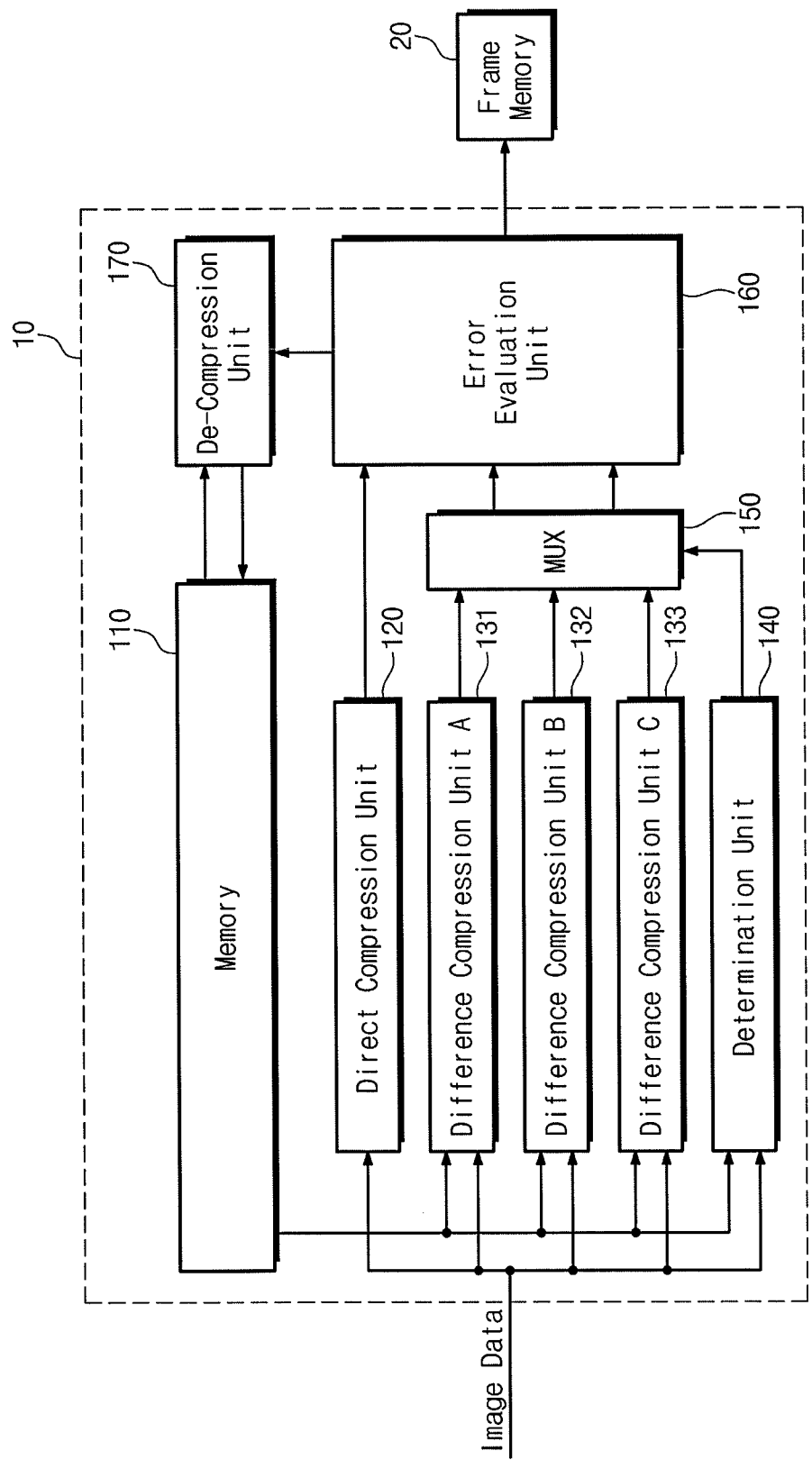
FIG. 2 illustrates a block diagram of a compressor according to an embodiment.

FIG. 2 illustrates a block diagram of the compressor 10 according to an embodiment. The compressor 10 may include a memory 110, a direct compression unit 120, a difference compression unit A 131, a difference compression unit B 132, a difference compression unit C 133, a determination unit 140, a multiplexer 150, an error evaluation unit 160, and a de-compression unit 170.

The memory 110 stores de-compression pixel values corresponding to a plurality of pixels. The plurality of pixels may at least include a reference pixel at a location determined with respect to a compression target pixel. In exemplary embodiments, de-compression pixel values of pixels in a row immediately adjacent a row containing the compression target pixel and de-compression pixel values of pixels immediately adjacent the compression target pixel are stored in the memory 110. For example, pixels in a row immediately above the row containing the compression target pixels, e.g., eleven pixels centered above the compression target pixel, and pixels immediately before, e.g., five pixels immediately before and in the same row as the compression target pixel, may be stored.

The reference pixel is a pixel capable of being used in the difference compression unit A 131, the difference compression unit B 132, and the difference compression unit C 133 (hereinafter, referred to as a difference compression unit when the difference compression unit A 131, the difference compression unit B 132, and the difference compression unit C 133 are not distinguished). The reference pixel will be more fully described below. The de-compression pixel value is a pixel value obtained by de-compressing a pixel value of each pixel that is included in image data and is compressed by one of the direct compression unit 120, the difference compression unit A 131, the difference compression unit B 132, and the difference compression unit C 133.

The direct compression unit 120 obtains a compression value by compressing a pixel value of the compression target pixel through quantization. The difference compression unit A 131 obtains a compression value by compressing a difference value between a pixel value of the compression target pixel and a pixel value of the reference pixel, through quantization. In exemplary embodiments, the difference compression unit A 131 uses three reference pixels, such that three difference values are calculated and three compression values are obtained by the difference compression unit A 131.

A compression operation of the difference compression unit B 132 is performed in the same manner as that of the difference compression unit A 131. However, the difference compression unit B 132 uses four reference pixels to obtain four compression values. In exemplary embodiments, reference pixels of the difference compression unit A 131 are different from reference pixels of the difference compression unit B 132. A compression operation of the difference compression unit C 133 is performed in the same manner as those of the difference compression unit A 131 and the difference compression unit B 132. However, the difference compression unit C 133 uses sixteen reference pixels to obtain sixteen compression values. In exemplary embodiments, reference pixels of the difference compression unit C 133 include reference pixels of the difference compression unit A 131 and the difference compression unit B 132.

The direct compression unit 120, the difference compression unit A 131, the difference compression unit B 132, and the difference compression unit C 133 output compression data including compression values thus obtained. Below, the direct compression unit 120, the difference compression unit A 131, the difference compression unit B 132, and the difference compression unit C 133 are more fully described.

Figure 3:
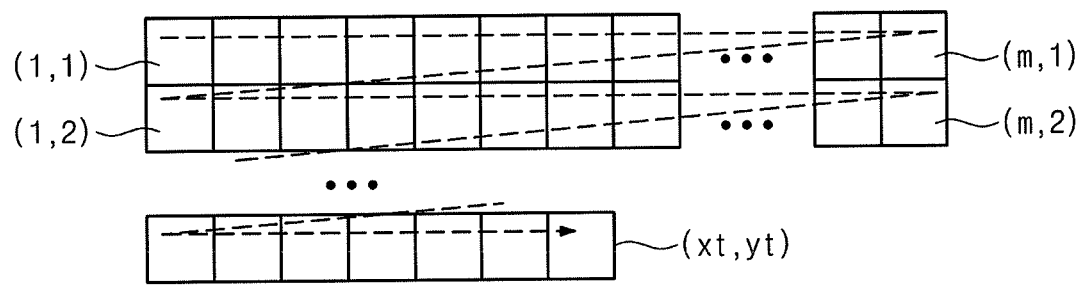
FIG. 3 illustrates a diagram for describing an input order of pixel values of image data, according to an embodiment.

FIG. 3 illustrates a diagram for describing an input order of pixel values of image data, according to an embodiment. In exemplary embodiments, input image data is data providing pixel values by a row unit as illustrated in FIG. 3. That is, pixel values (1, 1) to (1, m) corresponding to first to mth columns at the first row are sequentially provided, and then pixel values (2, 1) to (2, m) corresponding to first to mth columns at the second row are sequentially provided. Here, a compression target pixel is expressed by (xt, yt).

Figure 4A:
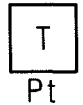
FIGS. 4A to 4D illustrate diagrams for describing a reference pixel of each compression method according to an embodiment.
Figure 4B:
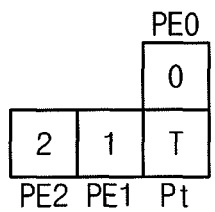
Figure 4C:
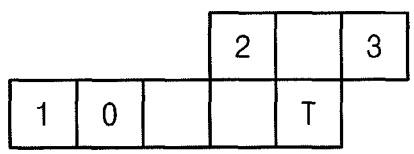
Figure 4D:
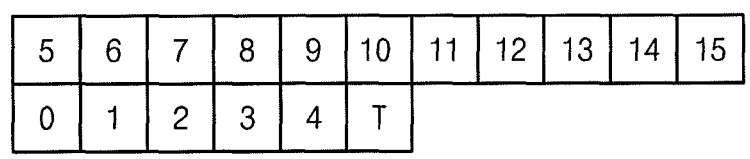

FIGS. 4A to 4D illustrate diagrams for describing a reference pixel of each compression method according to an embodiment. FIG. 4A shows a reference pixel of the direct compression unit 120, FIG. 4B shows reference pixels of the difference compression unit A 131, FIG. 4C shows reference pixels of the difference compression unit B 132, and FIG. 4D shows reference pixels of a difference compression unit C 133. In FIGS. 4A to 4D, a symbol 'T' indicates a compression target pixel, and reference numerals '0' to '15' indicate reference pixels, respectively. As described above, the direct compression unit 120 does not utilize adjacent pixels for reference Three reference pixels 0 to 2 are provided with respect to a compression target pixel T for compression of the difference compression unit A 131. As described above, the reference pixel is relatively decided with respect to a compression target pixel. If a location of the compression target pixel T is expressed by (xt, yt), the reference pixels 0, 1, and 2 correspond to pixels (xt, yt−−1), (xt−1, yt), and (xt−2, yt), respectively.

A pixel value of the compression target pixel T, a de-compression pixel value of the reference pixel 0, a de-compression pixel value of the reference pixel 1, and a de-compression pixel value of the reference pixel 2 are referred to as Pt, PE0, PE1, and PE2, respectively. Here, 'Pt' is a pixel value included in image data, and 'PE0', 'PE1', and 'PE2' are de-compression pixel values stored in the memory 110. The difference compression unit A 131 compresses three difference values (Pt−PE0), (Pt−PE1), and (Pt−PE2) through quantization and outputs three compression data.

Four reference pixels 0 to 3 are provided with respect to the compression target pixel T for compression of the difference compression unit B 132. If a location of the compression target pixel T is expressed by (xt, yt), the reference pixels 0, 1, 2, and 3 correspond to pixels (xt−3, yt), (xt−4, yt), (xt−1, yt−1), and (xt+1, yt−1), respectively. The difference compression unit B 132 compresses four difference values through quantization and outputs four compression data. As may be seen from FIGS. 4B and 4C, the four reference pixels used by the difference compression unit B 132 are all different from the three reference pixels used by the difference compression unit A 1312

Sixteen reference pixels 0 to 15 are provided with respect to the compression target pixel T for compression of the difference compression unit C 133. A description on a location of each reference pixel is omitted. However, as illustrated in FIG. 4D, each reference pixel is relatively provided with respect to the compression target pixel T, and may include all seven reference pixels used by the difference compression units A 131 and B 132. The difference compression unit C 133 compresses 16 difference values through quantization and outputs 16 compression data.

FIGS. 5A to 5D are diagrams for describing a configuration of compression data of each compression method according to an embodiment. FIG. 5A shows a configuration of compression data of the direct compression unit 120, FIG. 5B shows a configuration of compression data of the difference compression unit A 131, FIG. 5C shows a configuration of compression data of the difference compression unit B 132, and FIG. 5D shows a configuration of compression data of the difference compression unit C 133. Compression data of each pixel is 12-bit data having a fixed length and is divided into identifier data and compression value data. It is desirable to predetermine whether any portion of 12 bits is an identifier or a compression value. Also, in FIGS. 5B to 5D, a bit indicating a reference pixel is marked by 'Ref'. In FIGS. 5A to 5D, there is described an embodiment in which compression data is formed of 12 bits, but embodiments are not limited thereto.

The compression value means a pixel value or a difference value compressed through quantization in one of the direct compression unit 120, the difference compression unit A 131, the difference compression unit B 132, and the difference compression unit C 133. The identifier is a value for identifying whether compression data is generated from any one of the direct compression unit 120, the difference compression unit A 131, the difference compression unit B 132, and the difference compression unit C 133. The identifier also includes a value for identifying a reference pixel in case of compression data generated from any one of the difference compression unit A 131, the difference compression unit B 132, and the difference compression unit C 133.

In the difference compression unit C 133, an identifier different from those of the difference compression unit A 131 and the difference compression unit B 132 is not defined. Therefore, whether compression data is generated by the difference compression unit C 133 or by one of the difference compression unit A 131 and the difference compression unit B 132 is determined using a determination result of a determination unit 140 which will be described below.

Compression data generated by the direct compression unit 120 may include 12 bits: one bit of identifier, four bits of R compression value, four bits of G compression value, and three bits of B compression value. Alternatively, the B compression value may be formed of four bits, and each of the R compression value and the G compression value is formed of three bits. In a human, a resolution of a variation in brightness gradually increases in an order of B, R and G. When implementing one of R, G and B using fewer quantization bits, accuracy of the B compression value may be sacrificed.

Compression data generated by the difference compression unit A 131 may include 12 bits: three bits of identifier, three bits of R compression value, three bits of G compression value, and three bits of B compression value (hereinafter, compression values obtained by quantizing difference values being marked by $Q_R$, $Q_G$, and $Q_B$, respectively). Compression data generated by the difference compression unit B 132 may include 12 bits: five bits of identifier, two bits of $Q_R$ compression value, three bits of $Q_G$ compression value, and two bits of $Q_B$ compression value. Compression data generated by the difference compression unit C 133 may include 12 bits: five bits of identifier, two bits of $Q_R$ compression value, three bits of $Q_G$ compression value, and two bits of $Q_B$ compression value.

An identifier of each compression data identifies each compression method as follows. Whether compression data is generated by the direct compression unit 120 or by one of the difference compression unit A 131, the difference compression unit B 132, and the difference compression unit C 133 is determined using a first bit of an identifier. In exemplary embodiments, a first bit equal to 0 indicates that compression data was generated by the direct compression unit 120 and, a first bit equal to 1 indicates that compression data is generated by one of the difference compression unit A 131, the difference compression unit B 132, and the difference compression unit C 133.

In the event that compression data is generated by one of the difference compression unit A 131, the difference compression unit B 132, and the difference compression unit C 133, whether compression data is generated by one of the difference compression unit A 131, the difference compression unit B 132, and the difference compression unit C 133 is determined using a determination result of a determination unit 140. This will be more fully described below.

In the event that compression data is generated by one of the difference compression unit A 131 and the difference compression unit B 132, whether compression data is generated by the difference compression unit A 131 or the difference compression unit B 132 is determined, based on second and third bits of the identifier, that is, two bits. When second and third bits of the identifier equal '00', '01' or '10', compression data was generated by the difference compression unit A 131, and one of three reference pixels is determined. When second and third bits of the identifier equal '11', compression data was generated by the difference compression unit B 132. In this case, also, one of four reference pixels is determined at fourth and fifth bits.

In the event that compression data is generated by the difference compression unit C 133, one of 16 reference pixels is identified by second to fifth bits of the identifier, that is, four bits.

In exemplary embodiments, each of the direct compression unit 120, the difference compression unit A 131, the difference compression unit B 132, and the difference compression unit C 133 uses a quantization table at quantization. Also, it is possible to perform a compression operation (e.g., a shift operation, etc.) without a quantization table.

FIG. 6 illustrates a diagram for describing a quantization table for use in a direct compression unit 120 according to an embodiment. As illustrated in FIG. 6, in an 8-bit pixel value of each color, R and G are quantized to four bits (a quantization step size=17) and B is quantized to three bits (a quantization step size=36). For example, if the R of a pixel value Pt is 95, it is quantized to a compression value of 102 (=0110 when expressed by four bits). Meanwhile, if the B of the pixel value Pt is 95, it is quantized to a compression value of 108 (=011 when expressed by three bits).

When outputting compression data, the direct compression unit 120 outputs error data. The error data indicates an error generated before and after compression due to quantization. In exemplary embodiments, an error means a sum of an absolute value on a difference between a pixel value Pt and a compression value with respect to respective colors. For example, if an R of a pixel value Pt is 95, a G of the pixel value Pt is 140 and a B of the pixel value Pt is 45, R, G, and B compression values obtained through quantization are 102, 136 and 36. Therefore, an error is 20 (=|95−102|+|140−136|+|45−36|).

FIG. 7 illustrates a diagram for describing a quantization table for use in the difference compression unit A 131 according to an embodiment. Here, a difference value is (Pt−PEn) (n corresponding to a reference pixel and being 0, 1, and 2). 'Pt' indicates a pixel value, and 'PEn' indicates a de-compression value. The difference value is quantized to Q corresponding to a proximate difference value in a quantization table. For example, in the event that the pixel value Pt is 90 and a de-compression pixel value PE1 is 102, a difference value is −12. In the quantization table shown in FIG. 7, since a difference value proximate to the difference value of −12 is −16, Q corresponding thereto is quantized to 6. Also, if a proximate difference value is 2, a relatively smaller difference value is viewed as a proximate difference value according to a predetermined rule.

Similar to the direct compression unit 120, the difference compression unit A 131 outputs error data when compression data is output. The error data indicates an error generated before and after compression due to quantization. In exemplary embodiments, an error means a sum of an absolute value on a difference between a difference value, obtained from a pixel value Pt and a de-compression pixel value, and a proximate difference value of the quantization table with respect to respective colors. For example, if an R of a difference value between a pixel value Pt and a reference pixel is −12, G is 9 and B is 22, R, G and B proximate difference values of the quantization table are −16, 4, and 16. Therefore, an error is 15 (=|−12−(−16)|+"9−4|+|22−16|).

FIG. 8 illustrates a diagram for describing a quantization table for use in the difference compression unit B 132 according to an embodiment. FIG. 9 illustrates a diagram for describing a quantization table for use in the difference compression unit C 133 according to an embodiment. Quantization tables shown in FIGS. 8 and 9 are used substantially the same as a quantization table shown in FIG. 7, except that they are applied to different difference compression units, and a description thereof is thus omitted. Also, similar to the difference compression unit A 131, the difference compression unit B 132 and the difference compression unit C 133 output error data, and a description thereof is thus omitted.

Since a quantization table for use in the difference compression unit C 133 shown in FIG. 9 is used at a random pattern detection state to be described below, likelihood that a difference value becomes larger is high, and a difference value being a quantization reference has a large value as compared to two quantization tables different from the quantization table (a quantization step being larger). Also, when corresponding to a location of a pixel where a reference pixel does not exist, a pixel value may be viewed as a predetermined value (e.g., 0).

Quantization bits of a compression value of compression data generated by the difference compression unit B 132 and the difference compression unit C 133 are less than quantization bits of a compression value of compression data generated by the difference compression unit A 131. Since more quantization bits are allocated to an identifier, it is possible to increase the number of reference pixels. If the number of reference pixels increases, compression data with a less error is obtained although the number of quantization bits is small. This will be described below. Also, a compression method may be changed or modified such that difference compression units have the same number of reference pixels (e.g., a quantization table is only varied). In this case, the number of quantization bits allocated to an identifier is equal to the number of quantization bits allocated to a compression value. The above description is related to the direct compression unit 120 and the difference compression units 131 to 133.

Returning to FIG. 2, the determination unit 140 determines whether a compression target pixel is at a normal state or at a random pattern detection state, based on a de-compression pixel value of a determination pixel stored in the memory 110. The determination pixel is formed of a plurality of pixels relatively decided with respect to a compression target pixel T. For example, four pixels, that is, determination pixels 0, 1, 2, and 3 correspond to (xt−1, yt), (xt−2, yt), (xt−3, yt), and (xt−4, yt), respectively.

When it is determined that a compression target pixel is at a normal state, the determination unit 140 controls the multiplexer 150 such that compression data and error data output from the difference compression unit A 131 and the difference compression unit B 132 are provided to the error evaluation unit 160. When it is determined that a compression target pixel is at a random pattern detection state, the determination unit 140 controls such that compression data and error data output from the difference compression unit C 133 are provided to the error evaluation unit 160. In either case, that compression data and error data output from the direct compression unit 120 are provided to the error evaluation unit 160. A method of determining whether a compression target pixel is at a normal state or at a random pattern detection state will be described with reference to FIG. 10.

Figure 10:
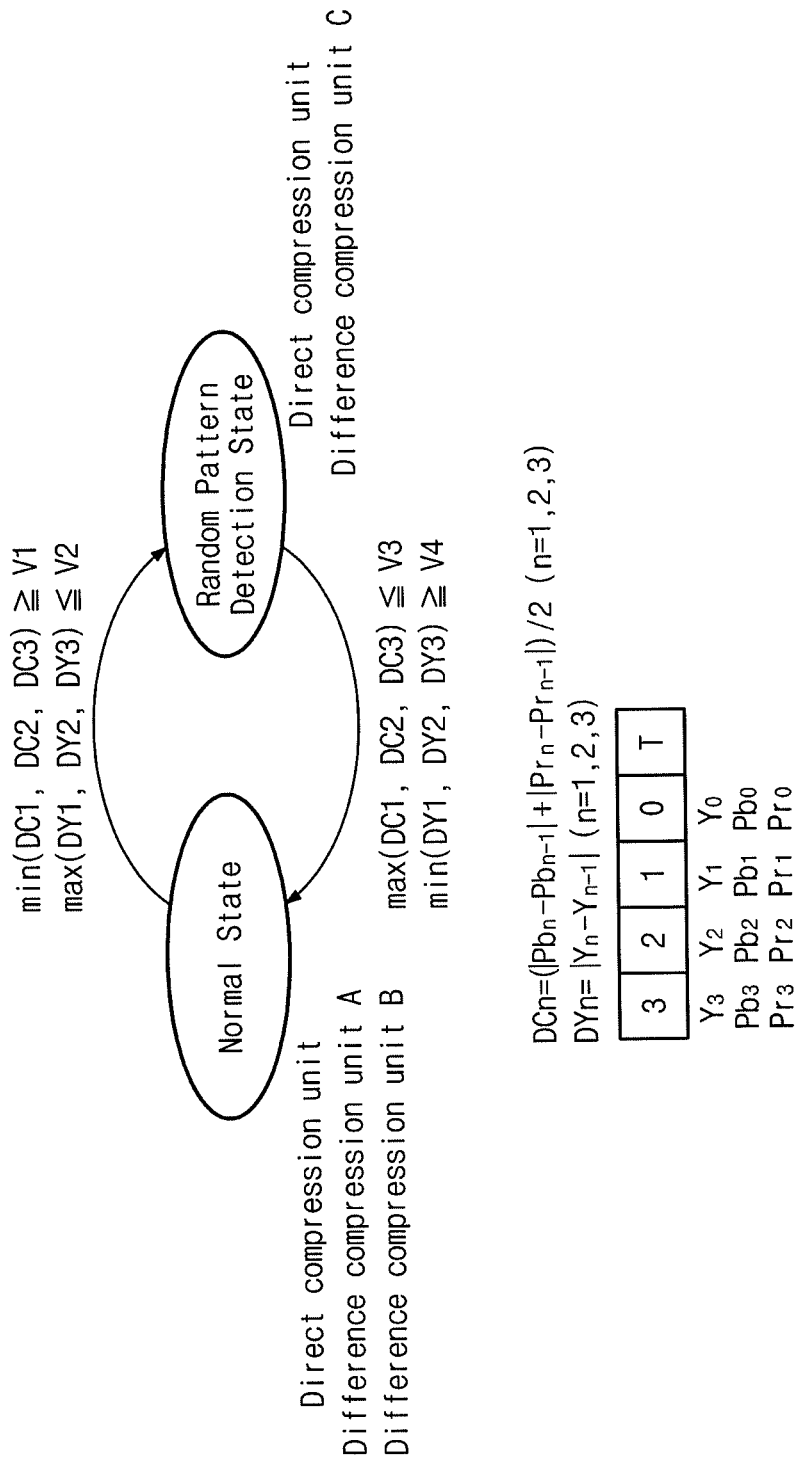
FIG. 10 illustrates a state transition diagram for describing an operation of a determination unit 140 according to an embodiment.

FIG. 10 illustrates a state transition diagram for describing an operation of the determination unit 140 according to an embodiment. The determination unit 140 converts de-compression pixel values of determination pixels 0 to 3 into a Y/Pb/Pr format (24 bits). The determination unit 140 calculates a brightness difference $DY_n$ and a difference of a color difference $DC_n$ between a determination pixel n and a determination pixel (n−1). Here, n is 1, 2, and 3.

$DC_n$ and $DY_n$ are calculated by: $DC_n=(|Pb_n-Pb_{n-1}|+|Pr_n-Pr_{n-1}|)/2$ and $DY_n=|Y_n-Y_{n-1}|$. Here, n is 1, 2, and 3, and Y/Pb/Pr of the determination pixel n is expressed by $Y_n/Pb_n/Pr_n$.

When a previous compression target pixel is in a normal state, the determination unit 140 determines a compression target pixel to be changed into a random pattern detection state when a minimum value of DC1, DC2, and DC3 is larger than a threshold value V1 (e.g., 20) and when a maximum value of DY1, DY2, and DY3 is smaller than a threshold value V2 (e.g., 20). In the event that such conditions are not satisfied, the determination unit 140 determines that a compression target pixel remains in a normal state.

When a previous compression target pixel is in a random pattern detection state, the determination unit 140 determines a compression target pixel to be changed into a normal state when a maximum value of DC1, DC2, and DC3 is smaller than a threshold value V3 (e.g., 10) and when a minimum value of DY1, DY2, and DY3 is larger than a threshold value V4 (e.g., 20). In the event that such conditions are not satisfied, the determination unit 140 determines that a compression target pixel remains in a random pattern detection state.

With the above-described setting, frequent chattering of the normal state and the random pattern detection state every compression target pixel may be prevented or reduced. In exemplary embodiments, a state is viewed as a normal state at a start of a frame.

In a relation between a compression target pixel and a neighboring determination pixel, if a variation in brightness Y is small and a variation in color difference Pb and Pr is large, likelihood that correlation between a compression target pixel and a determination pixel is low (random pattern) is high. Therefore, the difference compression unit C 133 that uses many reference pixels and of which difference values are largely set in a quantization table is used as a candidate of a compression method.

Returning to FIG. 2, the error evaluation unit 160 receives a plurality of compression data and error data pairs and selects a pair having the smallest error. The error evaluation unit 160 outputs compression data in the selected pair to the frame memory 20 and the de-compression unit 170. Thus, image data is compressed and is stored in the frame memory 20 as compression data. Meanwhile, the de-compression unit 170 de-compresses input compression data and outputs de-compressed data to the memory 110 as a de-compression pixel value.

The de-compression unit 170 identifies a compression method using an identifier of compression data and de-compresses a compression value through de-quantization in the compression method. A result value is stored in the memory 110 as a de-compression pixel value.

Figure 11:
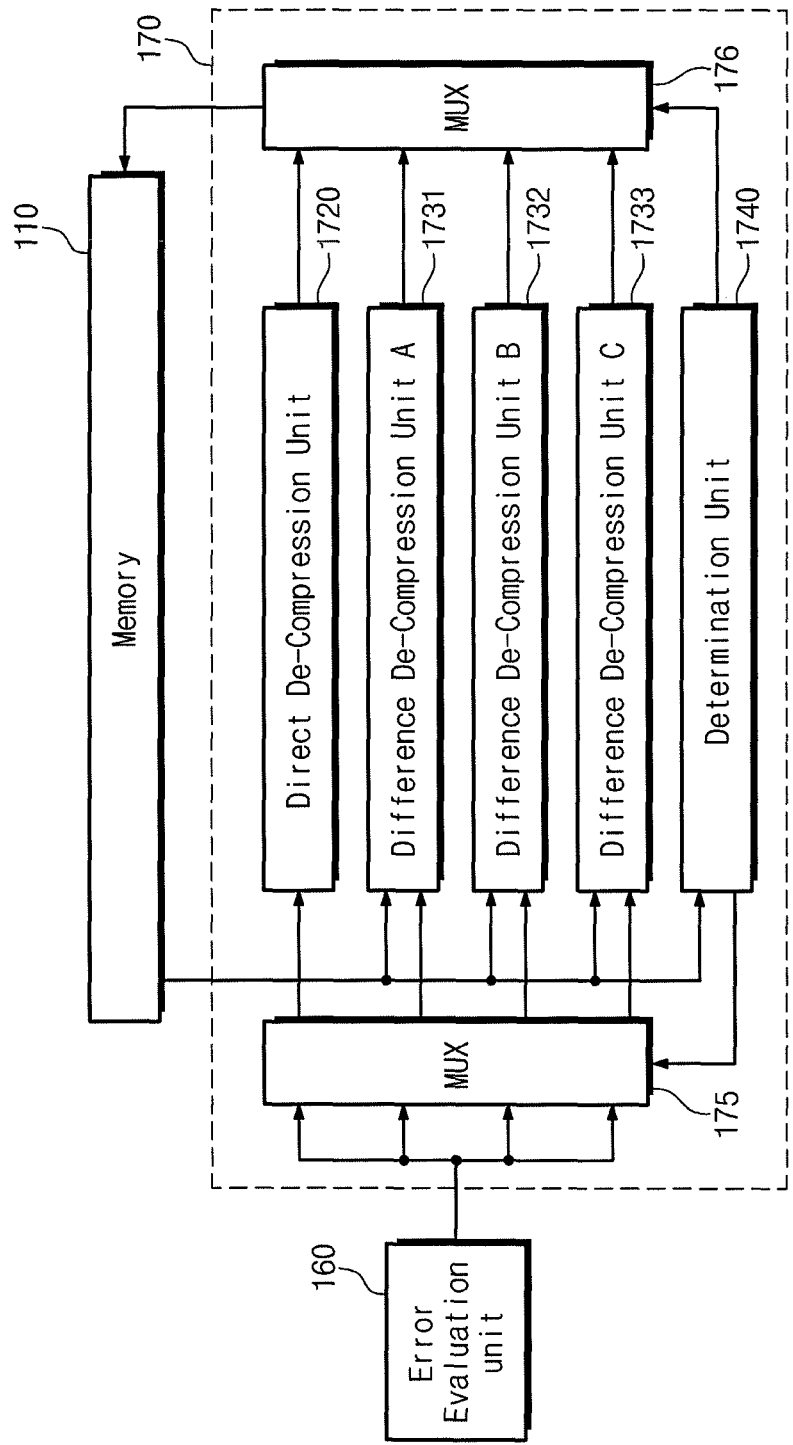
FIG. 11 illustrates a block diagram of a de-compression unit according to an embodiment.

FIG. 11 illustrates a block diagram of the de-compression unit 170 according to an embodiment. The compression unit 170 may include multiplexers 175 and 176, a direct de-compression unit 1720, a difference de-compression unit A 1731, a difference de-compression unit B 1732, a difference de-compression unit C 1733, and a determination unit 1740.

Like the above-described determination unit 140, the determination unit 1740 determines whether it is at a normal state or at a random pattern detection state. Therefore, the determination unit 1740 is the same as the determination unit 140. When the pixel is in a normal state, the determination unit 1740 controls the multiplexers 175 and 176 such that signal paths of the direct de-compression unit 1720, the difference de-compression unit A 1731, and the difference de-compression unit B 1732 are formed between an error evaluation unit 160 and a memory 110. When the pixel is in a random pattern detection state, the determination unit 1740 controls the multiplexers 175 and 176 such that signal paths of the direct de-compression unit 1720 and the difference de-compression unit C 1733 are formed between the error evaluation unit 160 and the memory 110.

If an identifier indicates that input compression data is generated by a direct compression unit 120 (e.g., when a first bit is 0), the direct de-compression unit 1720 refers a quantization table (refer to FIG. 6) used for the direct compression unit 120 and decompresses a compression value of compression data to store it in the memory 110. For example, if a compression value of R of compression data is '0110' (4-bit expression), a de-compression pixel value of R is '102'.

If an identifier indicates that input compression data is generated by the difference compression unit A 131 (e.g., when a first bit is 1 and second and third bits are not '11'), the difference de-compression unit A 1731 specifies a reference pixel based on second and third bits of the identifier, refers a quantization table (refer to FIG. 7) used for the difference compression unit A 131, and decompresses a compression value of compression data to store it in the memory 110. For example, if a compression value Q of R compression data is 6, a difference value is −16. If a de-compression pixel value of a particular reference pixel is 130, a de-compression pixel value of a de-compression target pixel is de-compressed to 114 (=130−16).

If an identifier indicates that input compression data is generated by the difference compression unit B 132 (e.g., when a first bit is 1 and second and third bits are '11'), the difference de-compression unit B 1732 specifies a reference pixel based on fourth and fifth bits of the identifier, refers a quantization table (refer to FIG. 8) used for the difference compression unit B 132, and decompresses a compression value of compression data to store it in the memory 110.

If an identifier indicates that input compression data is generated by the difference compression unit C 133 (e.g., when a first bit is 1), the difference de-compression unit C 1733 specifies a reference pixel based on second to fifth bits of the identifier and decompresses compression data referring to a quantization table (refer to FIG. 9) used for the difference compression unit C 133 to then store it in the memory 110.

Since the compressor 10 according to an embodiment selects a pixel having a high correlation with a compression target pixel from a wide range of reference pixels, it is possible to suppress lowering of the display quality due to compression. Also, there is suppressed lowering of the display quality by changing a plurality of compression methods with respect to a pixel having a slowly varying pixel value and a pixel having a sharply varying pixel values. When a pixel has a sharply varying pixel value, indicating a random pattern, an error due to quantization is reduced by using a quantization table in which a quantization step of a difference value is large. In such cases, a pixel with a high correlation may be spaced apart from a compression target pixel. However, lowering of the display quality is suppressed by selecting a pixel from a wide range of reference pixels. The above description is related to a configuration of the compressor 10.

Below, a configuration of a de-compressor 30 is described. The de-compressor 30 provides the driving unit 40 with a pixel value obtained by de-compressing compression data stored in the frame memory 20. The de-compressor 30 is configured the same as that of the above-described de-compression unit 170.

Figure 12:
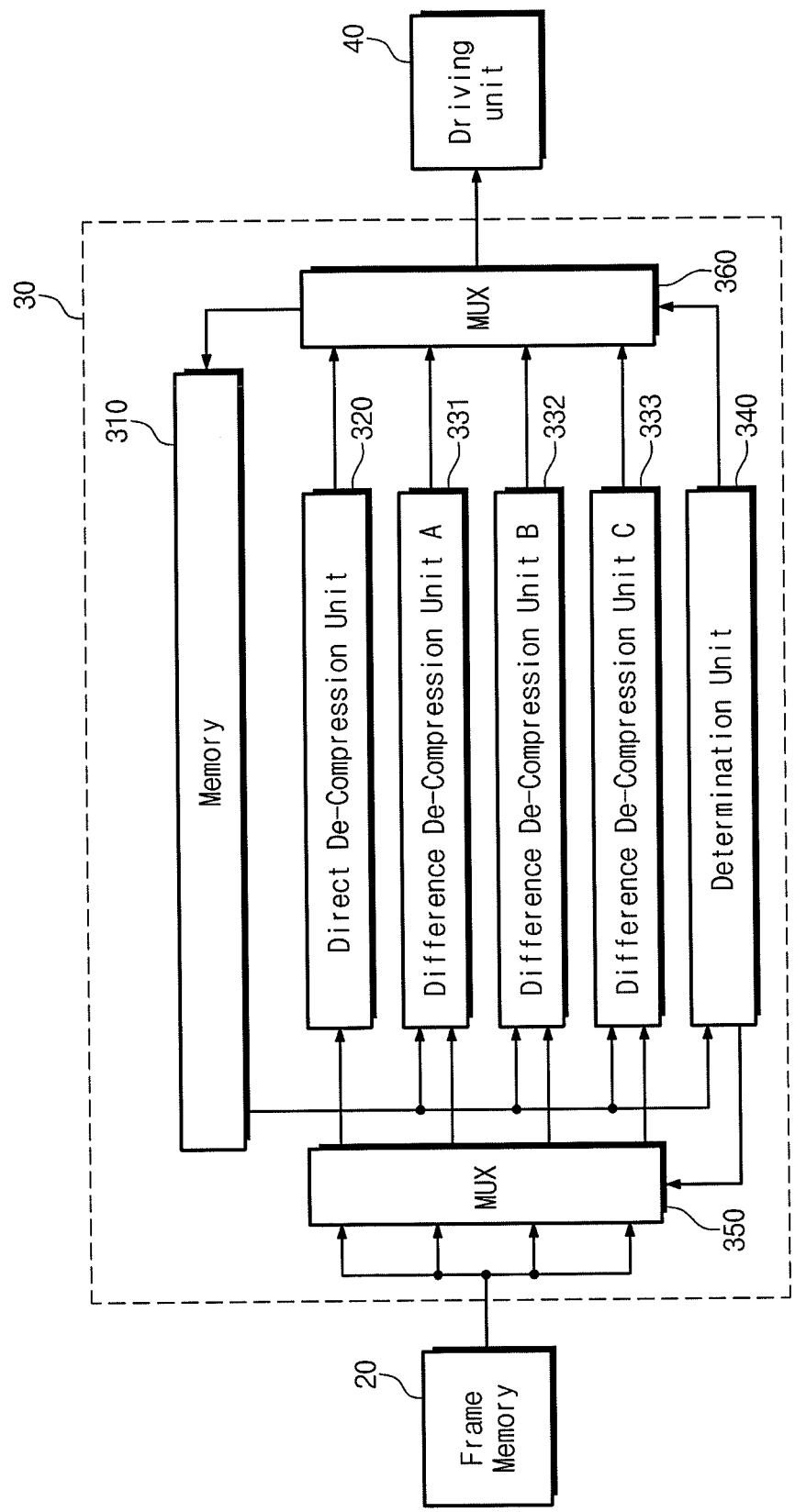
FIG. 12 illustrates a block diagram of a de-compressor according to an embodiment.

FIG. 12 illustrates a block diagram of a de-compressor 30 according to an embodiment. The de-compressor 30 may include a memory 310, a direct de-compression unit 320, a difference de-compression unit A 331, a difference de-compression unit B 332, and a difference de-compression unit C 333, a determination unit 340, and multiplexers 350 and 360.

The memory 310, the direct de-compression unit 320, the difference de-compression unit A 331, the difference de-compression unit B 332, the difference de-compression unit C 333, the determination unit 340, and the multiplexers 350 and 360 of the de-compressor 30 operate the same as the memory 110, the direct de-compression unit 1720, the difference de-compression unit A 1731, the difference de-compression unit B 1732, the difference de-compression unit C 1733, the determination unit 1740, and multiplexers 175 and 176 of the de-compression unit 170, and a description thereof is thus omitted. However, the multiplexer 360 not only stores a de-compression value in the memory 310, but also outputs the de-compression value to a driving unit 40.

The driving unit 40 uses a de-compression value output from the de-compressor 30 and drives a corresponding pixel of a display panel 50 to control a gray scale corresponding to the de-compression value. Thus, the display panel 50 displays an image based on image data compressed when stored in a frame memory 20.

In the display device 1 according to an embodiment that compresses image data using the above-described compressor 10, display quality of an image display through the display panel 50 may be maintained while reducing a capacity of the frame memory 20.

The embodiment described above uses the compressor 10 including the determination 140 for determining a normal state and a random pattern state. However, embodiments are not limited thereto. For example, a compressor 10A not including the determination unit 140 may be used.

Figure 13:
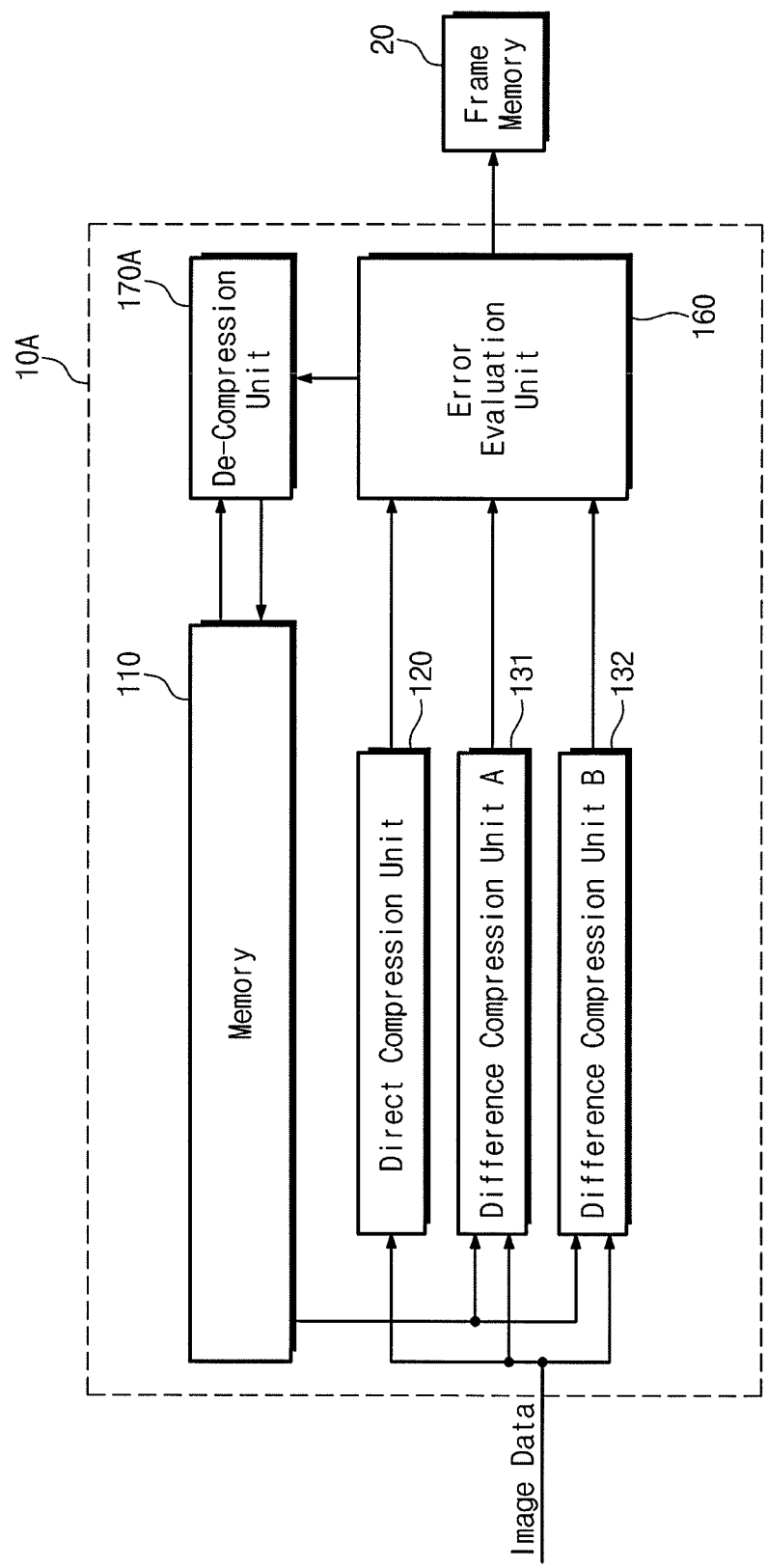
FIG. 13 illustrates a block diagram schematically illustrating a compressor according to another embodiment.

FIG. 13 illustrates a block diagram of the compressor 10A according to another embodiment. As illustrated in FIG. 13, a compressor 10A according to another embodiment is different from the compressor 10 according to the previous embodiment in that the compressor 10A does not include the difference compression unit C 133 and the determination unit 140. In this case, the de-compression unit 170 and the de-compressor 30 may correspond to a compression method of the compressor 10A, i.e., are modified in response to the deletion of the difference compression unit C133. That is, although not shown in detail, a de-compression unit 170A does not include the difference de-compression unit C 1733, the determination unit 1740, and multiplexers 175 and 176. Also, a de-compressor 30A (not shown) may not include the difference de-compression unit C 333, the determination unit 340, and multiplexers 350 and 360.

First Modified Embodiment

In the above-described embodiments, an error before and after compression is calculated, for example, by summing absolute values of differences between pixel values Pt and compression values of respective colors in a direct compression unit 120. However, an error may be calculated using another method. For example, a weighted value maybe assigned to each color. In case of B, a weighted value less than 1 and a difference between a pixel value Pt and a compression value are multiplied. In case of B, contribution to an error may be relatively reduced as compared to R and G. Since a difference value between a pixel value Pt and a compression value is expressed as an error, an error may be calculated through a predetermined operation using a pixel value Pt and a compression value. Also, a direct compression unit 120 is exemplarily described, but a method described using the direct compression unit 120 is also applied to a difference compression unit.

Second Modified Embodiment

In the above-described embodiment, a direct compression unit linearly compresses a pixel value of a compression target pixel. However, a pixel value of a compression target pixel may be compressed nonlinearly. Also, a difference compression unit nonlinearly compresses a difference value between a pixel value of a compression target pixel and a de-compression pixel value of a reference pixel. However, the difference value may be compressed linearly.

That is, embodiments may utilize both a direct compression unit for directly compressing a pixel value of a compression target pixel and a difference compression unit for compressing a difference value between a pixel value of a compression target pixel and a de-compression pixel value of a reference pixel. Also, embodiments may utilize both a linear compression method and a nonlinear compression method.

By way of summation and review, conventional approaches to reducing capacity requirements and price of the frame memory include compressing input image data before it is stored in the frame memory. However, if image data is compressed before storing in the frame memory, display quality may be lowered.

However, in accordance with one or more embodiments, image data may be compressed without sacrificing display quality. In particular, by using reference pixels having a high correlation with a target pixel, display quality may be maintained. Further, even when an image to be displayed includes a random pattern, image date may be compressed while maintaining display quality.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A compressor configured to receive image data indicating pixel values of a plurality of pixels and to compress a pixel value corresponding to each pixel, the compressor comprising:
a memory configured to store a de-compression pixel value de-compressed after the pixel value is compressed;
a direct compression unit configured to compress a pixel value corresponding to a compression target pixel;
a first difference compression unit configured to compress a difference value between the pixel value corresponding to the compression target pixel and a de-compression pixel value corresponding to at least one reference pixel;
an error evaluation unit configured to compare a pixel value error of the direct compression unit before and after compression with a difference value error of the first difference compression unit before and after compression, and to output a compression value obtained through compression of the direct compression unit or a compression value obtained through compression of the first difference compression unit together with an identifier indicating a compression method, based on the comparison result; and
a de-compression unit configured to de-compress an output compression value using a method indicated by the identifier and to store the de-compression result in the memory as a de-compression pixel value corresponding to the compression target pixel.

2. The compressor as claimed in claim 1, wherein:
the at least one reference pixel includes a first plurality of reference pixels,
the first difference compression unit compresses a first plurality of difference values obtained from the first plurality of reference pixels, and
the error evaluation unit compares the pixel value error of the direct compression unit before and after compression with difference value errors of the first difference compression unit before and after compression.

3. The compressor as claimed in claim 2, further comprising:
a second difference compression unit configured to compress a second plurality of difference values through a quantization method using fewer quantization bits than the first difference compression unit, the second plurality of difference values being obtained from the pixel value corresponding to the compression target pixel and de-compression pixel values corresponding to a second plurality of reference pixels, the second plurality being greater than the first plurality, and wherein the error evaluation unit compares the pixel value error of the direct compression unit before and after compression with difference value errors of the first and second difference compression units before and after compression, and outputs a compression value obtained through compression of the direct compression unit, a compression value obtained through compression of the first difference compression unit, or a compression value obtained through compression of the second difference compression unit together with the identifier, based on the comparison result.

4. The compressor as claimed in claim 3, further comprising:

a determination unit configured to determine whether the compression target pixel is in a first state or a second state, based on a plurality of de-compression pixel values stored in the memory, wherein, when the compression target pixel is in the first state, the error evaluation unit compares the pixel value error of the direct compression unit before and after compression with the difference value errors of the first difference compression unit before and after compression, and wherein, when the compression target pixel is in the second state, the error evaluation unit compares the pixel value error of the direct compression unit before and after compression with difference value errors of the second difference compression unit before and after compression.

5. The compressor as claimed in claim 4, wherein a determination reference of the determination unit is variable according to whether the compression target pixel is in the first state or in the second state.

6. The compressor as claimed in claim 5, wherein the de-compression unit de-compresses the output compression value based on the identifier and a determination result of the determination unit, and stores the de-compressed result in the memory.

7. The compressor as claimed in claim 4, further comprising:

a third difference compression unit configured to compress a third plurality of difference values through a quantization method using fewer quantization bits than the first difference compression unit, the third plurality of difference values being obtained from the pixel value corresponding to the compression target pixel and de-compression pixel values corresponding to a third plurality of reference pixels, the third plurality being less than the second plurality and greater than the first plurality.

8. The compressor as claimed in claim 7, wherein reference pixels of the first plurality of reference pixels are all different than reference pixels of the third plurality of reference pixels.

9. The compressor as claimed in claim 7, wherein reference pixels of the second plurality of reference pixels include reference pixels of the first plurality of pixels and reference pixels of the third plurality of reference pixels.

10. The compressor as claimed in claim 7, wherein, when the compression target pixel is in the first state, the error evaluation unit compares the pixel value error of the direct compression unit before and after compression, the difference value errors of the first difference compression unit before and after compression, and the difference value errors of the third difference compression unit before and after comparison.

11. The compressor as claimed in claim 2, further comprising:

a second difference compression unit configured to compress the plurality of difference values obtained from the pixel value corresponding to the compression target pixel and de-compression pixel values corresponding to the reference pixel provided in plurality through a quantization method different from that of the first difference compression unit, and wherein the error evaluation unit compares the pixel value error of the direct compression unit before and after compression with difference value errors of the first and second difference compression units before and after compression, and outputs a compression value obtained through compression of the direct compression unit, a compression value obtained through compression of the first difference compression unit, or a compression value obtained through compression of the second difference compression unit together with the identifier, based on the comparison result.

12. The compressor as claimed in claim 11, further comprising:

a determination unit configured to determine whether the compression target pixel is in a first state or in a second state, based on a plurality of de-compression pixel values stored in the memory, wherein, when the compression target pixel is in the first state, the error evaluation unit compares the pixel value error of the direct compression unit before and after compression with the difference value errors of the first difference compression unit before and after compression, and wherein, when the compression target pixel is in the second state, the error evaluation unit compares the pixel value error of the direct compression unit before and after compression with difference value errors of the second difference compression unit before and after compression.

13. A driving device, comprising:

the compressor as claimed in claim 1;

a frame memory configured to store the output compression value and the identifier;

a de-compressor configured to decompress a compression value stored in the frame memory using a method based on the identifier; and a driving unit configured to drive a plurality of pixels of a display panel, based on a pixel value obtained through de-compression of the de-compressor.

14. A display device comprising the driving device as claimed in claim 13 and the display panel.

* * * * *